Aug. 2, 1949.  A. WOLF  2,477,844
SEISMIC EXPLORATION WITH CONTROL
OF DIRECTIONAL SENSITIVITY
Original Filed April 20, 1943

INVENTOR.
ALEXANDER WOLF
BY
ATTORNEY

Patented Aug. 2, 1949

2,477,844

UNITED STATES PATENT OFFICE 2,477,844

SEISMIC EXPLORATION WITH CONTROL OF DIRECTIONAL SENSITIVITY

Alexander Wolf, Houston, Tex., assignor to Texaco Development Corporation, New York, N. Y., a corporation of Delaware Original application April 20, 1943, Serial No. 483,750, now Patent No. 2,431,600, dated November 25, 1947. Divided and this application April 25, 1947, Serial No. 743,903

3 Claims. (Cl. 177—352)

This invention relates to seismic exploration of the earth and more particularly to a method and a means for controlling the sensitivity of the recording apparatus so as to eliminate seismic waves reflected from substantially horizontal beds without affecting the sensitivity to waves propagated at an angle to the vertical, such as reflections from steeply dipping formations.

The principal object of the invention is to provide a seismic exploration system which discriminates against waves reflected from horizontal or gently dipping beds.

This is a division of my pending application Serial No. 483,750 filed April 20, 1943, now U. S. Letters Patent No. 2,431,600, granted November 25, 1947.

In the detailing of salt domes in the Gulf Coast region great difficulty has been experienced in obtaining and recording reflections from the sharply upturned beds in the close vicinity of a dome because the records consist largely of a series of reflections from the more or less flat lying beds away from the dome and under the shot point. Similar difficulties have been frequently encountered in detailing some of the steep anticlines, such as exist in California. Many instances have been found where reflections from different beds are superimposed on the same portion of a seismogram and this may occur wherever the array of reflecting beds is bent sharply upward, such as is commonly the case on the flanks of steep anticlines or salt domes. When a seismic wave detector is positioned at the surface of the earth above a substantially flat portion of a bed which bends steeply upwardly toward the surface, waves reflected from the horizontal portion of the bed may arrive at the detector at substantially the same time as the reflections from points on the inclined portion of the bed since the distance from the detector to the horizontal portion may be about the same as that from the detector to the sloping portion. Seismic reflection records obtained under these conditions are frequently so complicated by this superimposition of reflections that it is difficult, if not impossible, to distinguish the various reflections.

In accordance with the invention, a series of seismic detectors of the electrical type is placed along the surface of the earth in alignment with the shot point and the detectors in the series are separated from each other by a distance of say 150 feet. Each adjoining pair of detectors is connected to an indicating or a recording device, such as a recording galvanometer, either directly or through an amplifier in such a manner that the outputs of the detectors are in opposition. In this manner the difference in the output of each pair of detectors is recorded; waves reflected from a horizontal formation strike the detectors in each pair at about the same time so that the net output of the detectors is zero, while a wave reflected from a steeply dipping bed strikes the detectors in each pair some time interval apart; thus, there will be no decrease in the sensitivity to the waves reflected from the steeply dipping formations.

For a better understanding of the invention reference may be had to the accompanying drawings in which.

Figure 1:
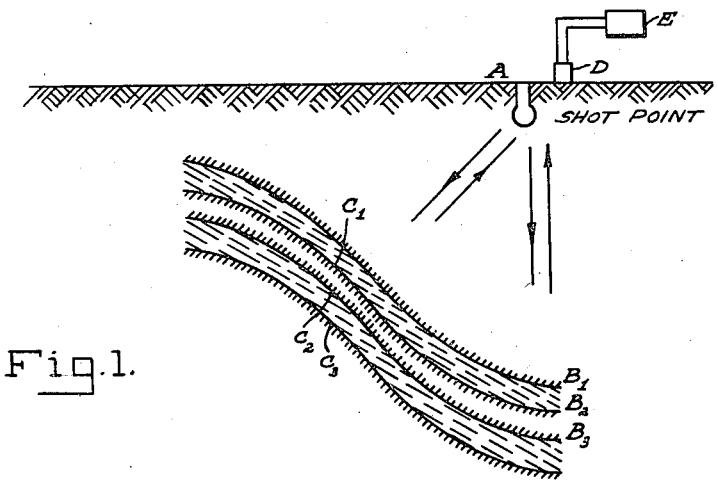
Figure 1 is a vertical section through a portion of the earth showing a seismic detector arranged to receive reflections from beds, a portion of which is horizontal and another portion steeply sloping.

Referring to the drawings, Figure 1 shows a vertical section through the flank of an anticline, and it will be noted that if an explosive charge is fired at the point A reflections from points $B_1$, $B_2$, and $B_3$ on the substantially horizontal portions of the formations arrive in the vicinity of A at substantially the same time as the reflections from points $C_1$, $C_2$ and $C_3$ on the sloping portions of the formations because the distance $AC_1$ is approximately the same as $AB_1$, etc. A seismic reflection record obtained by means of the detector D and recorded by means of the instrument E often becomes so complicated because of the superimposing of reflections that it is impossible to distinguish the various reflections.

U. S. Letters Patent have been issued on methods which claim to accomplish the exact opposite of the object of the present invention; that is, to discriminate against waves traveling horizontally and in favor of waves traveling vertically. As an example, the patent to Taylor, No. 1,799,398, relates to the recording of the "sum" of the outputs of two or more substantially identical seismometers or detectors spaced some distance apart on the surface of the ground. In accordance with the methods of which the Taylor patent is an example, a wave reflected from a gently dipping or horizontal bed, and therefore traveling substantially vertically, impinges on the two or more seismometers at about the same time so that the output of the combination is the same as the output of each multiplied by the number of units.

on the other hand, a wave traveling horizontally through the upper or surface formations may impinge on the various seismometers at different times and thus the positive half-cycle of one seismometer output may coincide in time with the negative half-cycle of another seismometer to effect partial cancellation. If the wave is actually periodic, which is seldom, if ever, the case, and if the detectors or seismometers are spaced exactly half a wave length apart, one should obtain total cancellation of the later phases of the wave. In practice the waves are not accurately periodic so that only partial cancellation can be secured.

Figure 2:
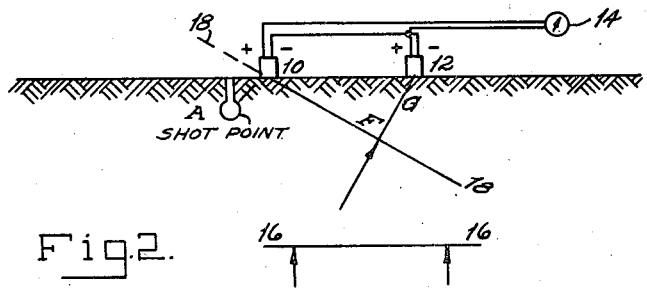
Figure 2 is an elevation on a larger scale than Figure 1 showing a pair of detectors arranged and connected in accordance with the invention.

To understand the scope of the present invention reference is made to Figure 2 which shows in enlarged view of the vertical section around the point A of Figure 1. Two seismic detectors 10 and 12 of the electrical type are placed on or directly below the surface of the ground and their outputs are connected in phase opposition to a recording galvanometer 14, either directly or through an amplifier, not shown. An explosive charge is fired at the point A and a wave, the front of which is represented by the line 16—16, reflected from a substantially horizontal bed such as $B_1$ of Figure 1, strikes both detectors 10 and 12 at substantially the same time. Since the detectors are connected in opposition their net output is zero both for the actual wave front and for the later quasi-harmonic vibration; on the other hand, a wave having the front 18—18 reflected from a steeply dipping bed such as $C_1$ of Figure 1 strikes the two seismometers some time interval part, depending upon the speed of propagation and the distance FG. FG is the space interval between detectors 10 and 12 projected onto the direction of propagation of wave 18—18. If FG is as large as a quarter wave length, full amplitude is reached by detector 10 before the wave reaches detector 12. If FG is half a wave length the later quasi-harmonic phases actually reinforce each other. The distance between the detectors 10 and 12 is not critical and in practical exploration it may be varied from about 50 feet to about 400 feet, depending on the order of magnitude of the angles of emergence of the waves expected in any region. A separation of 200 to 300 feet is usually satisfactory for angles of about 10 to 30 degrees, while a separation of 100 to 150 feet may be preferable for steeper angles. Regardless of the magnitude of the distance between detector 10 and detector 12, so long as reasonable limits are maintained, the system shown in Figure 2 has zero sensitivity to a wave traveling vertically, and increasingly higher sensitivity as the direction of propagation departs increasingly from the vertical up to the angle where actual reinforcement of the later phases will occur, as has been explained above.

The essential feature of the invention is the recording of the difference in the output of pairs of detectors having substantially identical sensitivities and spaced some distance apart at the surface. The detector 10 may, of course, be replaced by two or more detectors connected in series or parallel spaced on the ground in an arbitrary pattern, providing detector 12 is similarly replaced. Whenever the word "detector" is used, it is understood that a group of detectors connected in phase may be substituted. Various combinations of detectors in pairs will give the same result, as will be described hereinafter, provided there is maintained separation in space and simultaneous reversal of polarity of the detector outputs. Obviously this result will be obtained by connecting a pair of detectors in series opposition as shown in Figure 2 or by connecting them in parallel with the polarity of one detector reversed. The pairs of seismometers may be connected in opposition before amplification or their outputs may be amplified and then connected in opposition as will be described.

Various forms of "mixing" well known in the art, whereby the same detectors are made to operate on more than one galvanometer or other instrument, may be used so long as the final seismogram is a record of the difference in vibration between two points or areas on the surface of the ground spaced apart a substantial fraction of a wave length approximately at right angles to the strike of the formation under investigation.

Figure 3:
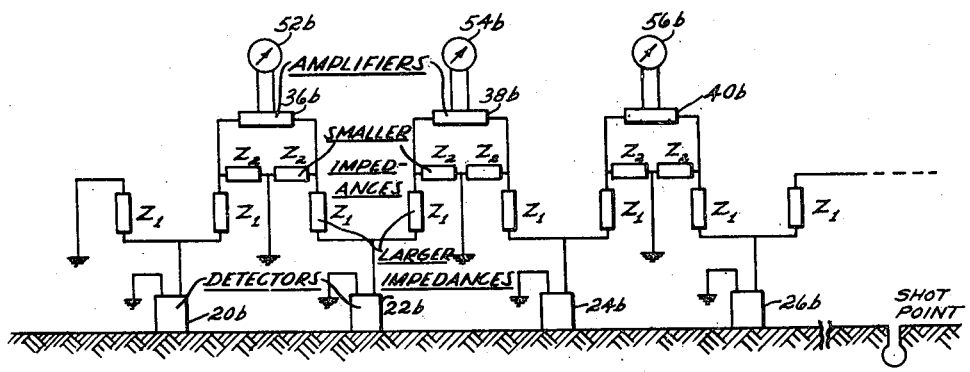
Figure 3 shows the outputs of the detectors as split, half of each detector output being connected in opposition to one amplifier.

It will be noted that the system shown in Figure 2 may require double the number of detectors of that ordinarily employed. Figure 3 discloses a detector or recording system which does not require any appreciable increase in the number of detectors over that customarily used in seismic exploration. Figure 3 shows a portion of a series of detectors $20_b$, $22_b$, $24_b$ and $26_b$ placed on the ground in line with a shot point. The output of each detector is split by means of impedances $Z_1$. Galvanometers $52_b$, $54_b$, and $56_b$ are connected directly to amplifiers $36_b$, $38_b$ and $40_b$ and each of these amplifiers is connected across a pair of smaller impedances $Z_2$ in series, with their center point grounded. If the impedances $Z_2$ are considerably smaller than the impedances $Z_1$, each galvanometer will record the difference between the outputs of the two amplifiers and hence the difference in the outputs of the two detectors. Each amplifier is also connected to the output impedances $Z_1$ of an adjoining pair of detectors. In this manner the galvanometer $52_b$ records the difference between the outputs of detectors $20_b$ and $22_b$; the galvanometer $54_b$ records the difference in the outputs of detectors $22_b$ and $24_b$ etc. One may also employ so-called dual detectors, containing two separate output coils, or even entirely separated movements, for the purpose of splitting the output of an instrument; in Fig. 3, one may also replace each impedance $Z_1$ by a complete amplifying unit, and omit the amplifiers $36_b$, $38_b$ and $40_b$. Numerous other arrangements of this type can obviously be devised.

It is to be understood that the objective sought by the arrangement shown in Figure 3 is the same as that described with reference to Figure 2, namely, the elimination of waves reflected from substantially horizontal beds located below the array of detectors so that superimposed reflections from steeply dipping beds will appear clearly in the record.

Obviously many modifications and variations of the invention, as hereinbefore set forth, may be made without departing from the spirit and scope thereof, but only such limitations should be imposed as are indicated in the appended claims.

I claim:

1. In a seismic exploration system for suppressing reflections from horizontal or gently dipping beds without materially reducing sensitivity to reflections from steeply dipping beds, a source of seismic waves, a plurality of seismic wave detectors disposed along the earth's surface in series alignment with said source, an indicating device connected to each adjoining pair of detectors, an impedance in the connection between said device and each detector, and a pair of impedances connected across each indicating device, the center point between each of said pairs of impedances being grounded, the value of each impedance in said pairs being less than the value of each of said impedances connected between a detector and an indicating device so that each of said devices will indicate the difference between the outputs of the detectors to which it is connected.

2. In a seismic exploration system for suppressing reflections from horizontal or gently dipping beds without materially reducing sensitivity to reflections from steeply dipping beds, a source of seismic waves, a plurality of seismic wave detectors disposed along the earth's surface in series alignment with said source, an amplifier connected to receive the output of each adjoining pair of detectors, an impedance in each connection between an amplifier and its respective detectors, an indicating device connected to each amplifier, and a pair of impedances connected across each amplifier, the center point between each of said pairs of impedances being grounded, the value of each impedance in said pairs being less than the value of each of said impedances connected between an amplifier and a detector so that each of said devices will indicate the difference between the outputs of the detectors to which it is connected.

3. In a seismic exploration system for suppressing reflections from horizontal or gently dipping beds without materially reducing sensitivity to reflections from steeply dipping beds, a source of seismic waves, a plurality of seismic wave detectors disposed along the earth's surface in series alignment with said source, an amplifier connected to each adjoining pair of detectors, an indicating device connected to receive the output of each amplifier, an impedance in the connection between said amplifier and each detector, and a pair of impedances connected across each amplifier, the center point between each of said pairs of impedances being grounded, the value of each impedance in said pairs being less than the value of each of said impedances connected between a detector and an amplifier so that each of said devices will indicate the difference between the outputs of an adjoining pair of detectors.

ALEXANDER WOLF.

REFERENCES CITED

The following references are of record in the file of this patent:

UNITED STATES PATENTS

| Number | Name | Date |
|---|---|---|
| 2,087,702 | Peters | July 20, 1937 |
| 2,184,313 | Owen | Dec. 26, 1939 |
| 2,215,297 | Owen | Sept. 17, 1940 |
| 2,266,041 | Hoover | Dec. 16, 1941 |
| 2,348,409 | Parr | May 9, 1944 |